United States Patent
Wallenius et al.

(10) Patent No.: US 6,980,791 B2
(45) Date of Patent: Dec. 27, 2005

(54) CHARGING CONTROL OF TELECOMMUNICATION NETWORK SUBSCRIBER

(75) Inventors: Jukka Wallenius, Helsinki (FI); Erkki Ojala, Veikkola (FI); Jari Eikkula, Espoo (FI)

(73) Assignee: Nokia Corporation, Espoo (FI)

( * ) Notice: Subject to any disclaimer, the term of this patent is extended or adjusted under 35 U.S.C. 154(b) by 581 days.

(21) Appl. No.: 10/152,353

(22) Filed: May 22, 2002

(65) Prior Publication Data

US 2002/0183041 A1 Dec. 5, 2002

Related U.S. Application Data

(63) Continuation of application No. PCT/FI00/01019, filed on Nov. 23, 2000.

(30) Foreign Application Priority Data

Nov. 26, 1999 (FI) .................................. 19992534

(51) Int. Cl.[7] .............................................. H04Q 7/20
(52) U.S. Cl. .................. 455/406; 455/408; 379/114.28
(58) Field of Search .............................. 455/406, 407, 455/408; 379/114.28, 114.29, 115.01, 126, 379/133, 201.01, 211.04

(56) References Cited

U.S. PATENT DOCUMENTS

| | | | |
|---|---|---|---|
| 5,511,113 A * | 4/1996 | Tasaki et al. .......... 379/114.28 |
| 5,557,664 A | 9/1996 | Burns et al. | |
| 5,742,667 A * | 4/1998 | Smith ................... 379/112.09 |
| 5,912,954 A | 6/1999 | Whited et al. | |
| 5,991,616 A | 11/1999 | Mirza et al. | |
| 6,222,912 B1 * | 4/2001 | Breuer .................. 379/114.24 |
| 6,345,182 B1 * | 2/2002 | Fabritius et al. ............ 455/408 |
| 6,625,268 B1 * | 9/2003 | Wallenius .............. 379/114.28 |

FOREIGN PATENT DOCUMENTS

| | | |
|---|---|---|
| EP | 0 751 662 | 1/1997 |
| GB | 2 254 224 | 9/1992 |
| WO | WO 98/59504 | 12/1998 |
| WO | WO 99/39519 | 8/1999 |
| WO | WO 99/59350 | 11/1999 |
| WO | WO 00/11859 | 3/2000 |

* cited by examiner

*Primary Examiner*—Jean Gelin
(74) *Attorney, Agent, or Firm*—Pillsbury Winthrop Shaw Pittman LLP

(57) ABSTRACT

A method and arrangement for charging a telecommunication network subscriber by means of an intelligent network (IN), the arrangement comprising at least one IN service switching point (102) and at least one IN service control point (104) and being arranged to route a call of a subscriber (100) from an originating switching point (101) or a transfer point to a particular service switching point (102) for producing an IN service, to send an enquiry from the service switching point (102) to the service control point (104) in response to call routing to the service switching point (102), to send instructions from the service control point (104) to the service switching point (102) for carrying out the subscriber (100) charging in response to the enquiry received by the the service control point (104), said instructions comprising information whether subscriber charging is to be performed by the service switching point.

38 Claims, 1 Drawing Sheet

CHARGING CONTROL OF TELECOMMUNICATION NETWORK SUBSCRIBER

This application is a Continuation of International Application PCT/FI00/01019 filed on 23 Nov. 2000, which designated the U.S. and was published under PCT Article 21(2) in English.

BACKGROUND OF THE INVENTION

The invention relates to a method and arrangement for charging a telecommunication network subscriber by means of an intelligent network.

In telecommunication networks, intelligence relates to an ability to access stored data, process it and make decisions on the basis thereof. Current telecommunication networks, such as public switched telephone networks PSTN, are intelligent to some extent, since they are able to process stored data, for instance, in call routing. In the current telecommunication networks, a typical 'intelligent' facility is conditional call forwarding, which requires a call state analysis and call rerouting according to the stored service profile of the call forwarding. Intelligent facilities of this type have been an integral part of the basic network, so changing or adding facilities has required software updating in all switching centres of the network.

The intelligent network (IN) is a network architecture connected to the basic network (for instance, a fixed or a mobile network), enabling faster, easier and more flexible service implementation and service control. This is effected by transferring the service control from the switching centre to a separate functional IN unit. Thus the services become independent of the basic network operation, and the basic network structure and software need not be changed when services are altered or added.

IN standardization has progressed rapidly during the past few years. These standards define a certain functional and hierarchical model for the intelligent network. In said model, the service control is transferred from the switching centre of the basic network to a service control function (SCF) or a service control point (SCP) of the intelligent network. The service control function comprises all service logic and service-related control (for instance, the required database and service logic programs SLP, in other words, computer programs that implement the logic structure of a particular service, i.e. service logic). The service control logic can be a logic function alone which a service switching point (SSP) sees as an entity. The service switching point (SSP) is typically a switching centre, for instance a switching centre of the basic network, which implements a service switching function (SSF), i.e. IN service identification and initialization of interaction with the service control point (SCP). When a call involving an IN service is established, the service switching point SSP provides for connection arrangements. An IN service is produced such that in connection with encountering service-related detection points (DP) defined by the call state model (BCSM) which describes the call control operation, the IN service is started, whereby the SSP enquires instructions from the SCP. In other words, the SSP transfers control to the SCP and starts waiting for operations from the SCP. In connection with triggering the IN service, a service logic program SLP is started in the SCP, and the operation of the SLP defines the instructions that the SCP sends in each call phase to the SSP. The SSP interprets the instructions received and starts the required call control functions. To trigger an IN service refers to starting an IN service in response to an invocation generated when a particular identification condition is fulfilled.

The above describes the current structure of intelligent networks. In the present application, the intelligent network refers in general to a solution, in which a node conveying a call, session or packet data accesses a service control function that gives said node instructions to convey the call, session or packet data. Said node's access to the service control function is based on the service trigger data stored in the node. The intelligent network is characterized by triggers, state models and a controlling protocol or an API interface between the control function and the network switching node. The conveyance of the call, session or packet data can be described with a state model which is visible to the control function and which comprises phases and detection points related thereto, in which the processing can be stopped to wait for instructions from the control function. The controls and the operations can also be methods directed to call entities and event notifications related thereto.

The current IN solutions of various manufacturers are not necessarily compatible with each other and all manufacturers do not necessarily support the IN architecture of, for example, the GSM (Global System for Mobile Communications) network. Therefore, originating or transferred calls that employ IN services (for instance, the SCP-controlled chargeable announcements to subscriber) have to be routed to a centralized IN service switching point that is connected to the service control point of the same manufacturer.

A problem with the above-described arrangement is that the originating or transferred calls are generally charged in the originating switching centre or a transfer point. So when the intelligent network is used for charging, whereby the IN-assisted charging is effected in the centralized service switching point, the call tariff doubles since the originating switching centre or the transfer point also performs independent charging.

BRIEF DESCRIPTION OF THE INVENTION

The object of the invention is to provide a method and equipment implementing the method such that the above problems can be solved. This is achieved with a method and arrangement which are characterized by what is disclosed in the independent claims 1, 16 and 31. The preferred embodiments of the invention are disclosed in the dependent claims.

The invention is based on the idea that in order to control charging data collection of a subscriber or a subscriber category by means of the intelligent network, the originating or transferred call of said subscribers are routed to a centralized service switching point, in which the relating charging instructions are requested from a service control point. The service control point sends the instructions on subscriber charging, and said charging is performed by the centralized service switching point according to the instructions.

In accordance with one preferred embodiment of the invention, the centralized service switching point notifies the originating switching centre or the transfer point, from which the call is routed to the service switching point, that the call is free of charge, and the subscriber's call is charged in the centralized service switching point.

In accordance with a second preferred embodiment of the invention, metering pulses are sent from the centralized service switching point to the originating switching centre or the transfer point, from which the call is routed to the service switching point, and the subscriber's call is charged in the originating switching centre or the transfer point by means of the metering pulses.

In accordance with yet another preferred embodiment of the invention, tariff data are sent from the centralized service switching point to the originating switching centre or the transfer point, from which the call is routed to the service switching point, and the subscriber's call is charged in the originating switching centre or the transfer point by means of the tariff data.

An advantage with the method and system of the invention is that they enable charging to be controlled by means of the intelligent network also in the telecommunication systems employing a centralized IN service switching point.

BRIEF DESCRIPTION OF THE DRAWINGS

In the following, the invention will be described in greater detail in connection with preferred embodiments with reference to the accompanying drawings, in which.

DETAILED DESCRIPTION OF THE INVENTION

Figure 1:
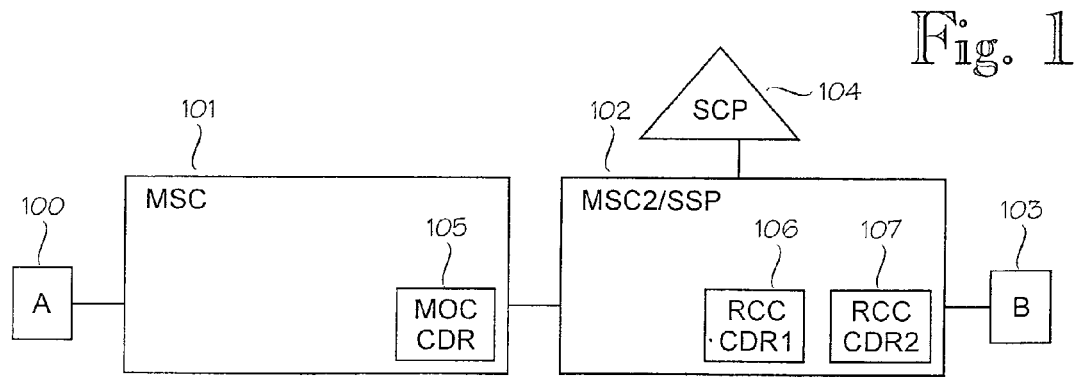
FIG. 1 shows elements of a telecommunication system utilizing an intelligent network that are relevant to the invention.

FIG. 1 illustrates elements of a telecommunication system utilizing an intelligent network that are relevant to the invention. Even though the operation of the invention will be described here in connection with the GSM mobile system, this does not restrict in any way the application of the invention to other types of telecommunication systems, such as a public switched telephone network (PSTN). In FIG. 1, a calling party i.e. subscriber A 100 establishes a connection to a called party i.e. subscriber B 103. A mobile switching centre MSC 101 is the originating switching centre (or point) of the connection. For clarity, a base station or a base station controller or other possible network elements between the subscriber A, which is a mobile station in this example, and the mobile switching centre 101 are not shown. Since the mobile switching centre 101 does not support IN services or it is not compatible with an IN service control point (SCP) 104 used, in order to utilize the IN services, a call is routed from the mobile switching centre 101 to a centralized IN service switching point (SSP) 102, which is a mobile switching centre MSC2, for instance, and which is connected to the SCP 104. Call-related IN services can thus be produced by means of the SSP 102 and the SCP 104. From the SSP 102 the call is routed further to the subscriber B 103 for call setup. It should be noted that there can be more network elements, such as mobile switching centres, between the subscribers A and B than what is shown in FIG. 1. Likewise, the intelligent network can comprise a plurality of centralized service switching points 102 and control points 104 without that it is of any importance to the basic idea of the invention.

Figure 3:
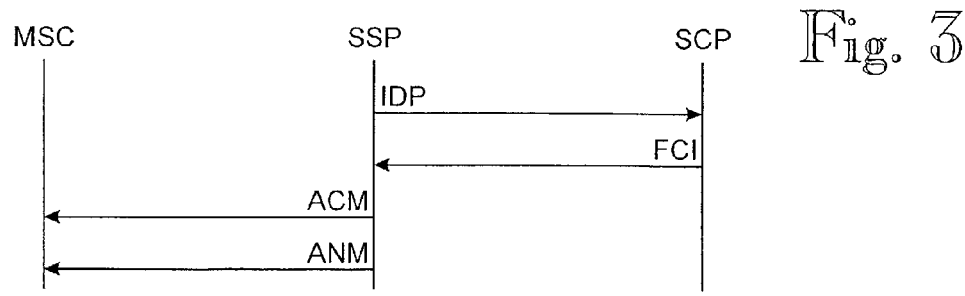
FIG. 3 shows a signalling diagram of operations relating to the charging arrangement in accordance with one embodiment of the invention.

In the GSM system, the subscriber 100 charging normally occurs in the originating switching centre 101 (or in the transfer switching centre). A mobile originated call charging data record (MOC CDR) 105 is generated in the originating switching centre 101 for charging the mobile station 100 originated call. When the call is routed to the SSP 102 for utilizing the IN services, the SSP sends an IDP (Initial Detection Point) message to the IN service control point 104 for starting the IN service. FIG. 3 shows a signalling diagram of operations between the mobile switching centre (MSC) 101, the SSP 102 and the SCP 104 relating to charging arrangements. The SCP sends charging instructions to the SSP which performs charging according to the instructions.

In accordance with one preferred embodiment of the invention, the SSP notifies the originating switching centre 101 that the call is free of charge, whereby no chargeable balance is accrued in the charging data record 105 of the originating switching centre 101 and the charging can be performed in the SSP. Preferably, when it is indicated to the originating switching center that the call is free of charge the originating switching centre does not generate and/or forward the charging data records 105 for such calls to the operator billing system (not shown). Alternatively, the SSP can also send metering pulses to the originating switching centre 101, which generates a charging data record 105 on the basis of said pulses, or the SSP can notify the tariff data to be used for charging to the originating switching centre 101.

Figure 2:
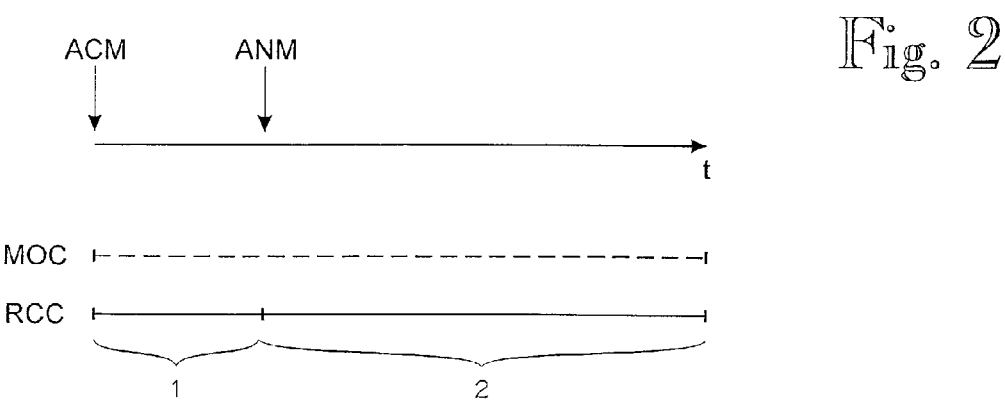
FIG. 2 is a diagram showing how charging data are formed in accordance with one embodiment of the invention.

If the charging is performed in the SSP, charging data records (RCC CDR, Remote Charging Control) 106 and 107 are generated in the SSP for the call of the subscriber A according to the instructions received from the SCP. This is preferably effected such that the SCP sends charging instructions in response to the received IDP message. The instructions can be sent (FIG. 3) in connection with an FCI (Furnish Charging Information) message, for instance. Then the message includes at least information on where the charging will be performed, such as a particular message parameter indicating whether the SSP performs the charging or not, and whether the charging potentially performed in the SSP is to replace the charging performed in the originating switching centre. The SCP can also send instructions on the tariffs to be used for charging and data required for generating RCC CDRs 106 and 107. These can be sent in the same message as the previously mentioned parameters or in separate messages. If the SSP is instructed to perform the charging, it sends information to the originating switching centre 101 that the call is free of charge. This can be carried out by sending in backward call setup signalling an indicator that states that the call is free of charge, for instance, (FIG. 3) by ACM. (Address Complete Message) and ANM (Answer Message) messages, for instance by means of specific parameters included in the messages. The ACM message is generally transmitted in a step where the subscriber B 103 answers paging and the ANM message in a step where the subscriber B pushes the answer key of his telephone. FIG. 2 illustrates the generating of charging data records CDR. In this example, charging is performed in two steps, whereby two charging data records RCC CDR 106 and 107 are formed in the SSP: the first charging data record 106 (time line 1 in FIG. 2) which consists of a call-setup-related chargeable announcement possibly transmitted to the subscriber A and the second charging data record 107 (time line 2, in FIG. 2) which consists of the actual connection between the subscribers A and B. Correspondingly, information on the call being free of charge is sent from the SSP to the originating switching centre 101, preferably in two steps: in connection with the ACM message concerning the period of time starting when the subscriber B answers paging and ending when the subscriber B pushes the answer key of his telephone, and in connection with the ANM message concerning the actual connection phase between the subscribers A and B. FIG. 2 shows a situation where, in conjunction with both the ACM and the ANM messages, information is sent to the originating switching centre that the call is free of charge, whereby no chargeable balance is accrued in the charging data record MOC CDR, indicated by a broken line in FIG. 2, of the originating switching centre. The charging is then performed in the SSP, whereby the chargeable balance accrues in the SSP charging data records RCC CDR1 and RCC CDR2, which is indicated by a continuous line in FIG. 2. There can also be only one or more than two SSP charging data records RCC CDR, depending on the system to which the invention is applied without that it is of any importance to the basic idea of the invention. For instance, the charging data record RCC CDR1 is not necessarily needed if no announcements are sent prior to the actual connection or if they are not chargeable. The information on the chargeability of the announcements or other service procedures can be sent e.g. in the user interaction instructions from the SCP. Said information on the chargeability of service procedures is given by e.g. providing tariff data at service procedure start and/or another tariff data at service procedure end. In addition to announcements, a plurality of other types of separate chargeable or non-chargeable service procedures can be applied to the subscriber. Digits may be prompted and collected-from the subscriber. The subscriber may be connected temporarily to an external intelligent peripheral and an in-band user interaction application may be executed there. It should be noted as well that the SCP can also control the tariff for the charging data records generated at the SSP. It is obvious that to implement the invention, other messages than those described above or completely new dedicated messages can also be used for communication between the network elements. For instance, the signalling diagram of FIG. 3 is only intended to illustrate by way of example one possible application of the invention.

It is obvious to the person skilled in the art that as technology progresses the basic idea of the invention can be implemented in a variety of ways. Thus the invention and its embodiments are not restricted to the above-described examples but they may vary within the scope of the claims.

What is claimed is:

1. A method for charging a telecommunication network subscriber by means of an intelligent network which comprises at least one service switching point and at least one service control point, whereby the subscriber's call is routed from an originating switching point or a transfer point to a particular service switching point in order to produce an intelligent network service, comprising:
    sending an enquiry from the service switching point to the service control point in response to the call routing to the service switching point; and
    sending instructions on subscriber charging to the service switching point in response to the enquiry received in the service control point, said instructions on subscriber charging comprising information whether subscriber charging is to be performed in the service switching point.

2. A method as claimed in claim 1, wherein said instructions on subscriber charging comprise additional instructions for the subscriber charging to be performed at the service switching point.

3. A method as claimed in claim 2, wherein said additional instructions for the subscriber charging to be performed in the service switching point comprise tariff data for the call.

4. A method as claimed in claim 2, wherein said additional instructions for the subscriber charging to be performed in the service switching point comprise an indication which service procedures are chargeable.

5. A method as claimed in claim 4, wherein said indication is carried in at least one user interaction related instruction to the service switching point and in that the service procedures include one or more of the following: playing an announcement for the subscriber, prompting and collecting digits from the subscriber, executing a user interaction application in an external intelligent peripheral.

6. A method as claimed in claim 4, wherein said indication is given by providing tariff data at service procedure start and/or another tariff data at service procedure end.

7. A method as claimed in claim 1, wherein said instructions on subscriber charging specify whether the subscriber charging performed at the service switching point is to replace the subscriber charging performed in the originating switching point or in the transfer point from which the subscriber's call is routed to the service switching point.

8. A method as claimed in claim 1, wherein the performing of the subscriber charging in the service-switching point comprises controlling of the subscriber charging from the service switching point according to the instructions sent to the service switching point.

9. A method as claimed in claim 8, wherein the controlling of the subscriber charging from the service switching point comprises:
    notifying from the service switching point to the originating switching point or the transfer point from which the subscriber's call was routed to the service switching point that the call is free of charge; and
    performing the charging of the subscriber's call in the service switching point.

10. A method as claimed in claim 9, wherein the notifying to the originating switching point or the transfer point that the call is free of charge, is performed by sending in backward call setup signalling an indicator that states that the call is free of charge.

11. A method as claimed in claim 10, wherein the indicator, which is sent in the backward call setup signalling and states that the call is free of charge, is conveyed in an ACM (Address Complete Message) and/or an ANM (Answer Message).

12. A method as claimed in claim 8, wherein the controlling of the subscriber charging from the service switching point comprises:
    sending metering pulses from the service switching point to the originating switching point or the transfer point from which the subscriber's call was routed to the service switching point; and
    performing the charging of the subscriber's call in the originating switching center or the transfer point by means of said metering pulses.

13. A method as claimed in claim 8, wherein the controlling of the subscriber charging from the service switching point comprises:
    sending tariff data from the service switching point to the originating switching point or the transfer point from which the subscriber's call was routed to the service switching point; and
    performing the charging of the subscriber's call in the originating switching center or the transfer point by means of the tariff data.

14. A method as claimed in claim 1, wherein the performing of the subscriber charging in the service switching point comprises generating charging data records.

15. A method as claimed in claim 14, wherein free of charge charging data records are not generated in the originating switching center and/or sent from there to the operator billing system.

16. An arrangement for charging of a telecommunication network subscriber by means of an intelligent network, the arrangement comprising at least one intelligent network service switching point and at least one intelligent network service control point and being arranged to route a call of a subscriber from an originating switching point or a transfer point to a particular service switching point in order to produce an intelligent network service, whereby the service switching point is arranged to send an enquiry to the service control point in response to the call routing to the service switching point; and the service control point is arranged to send instructions on subscriber charging to the service switching point in response to the enquiry received in the service control point said instructions on subscriber charging comprising information whether subscriber charging is to be performed by the service switching point.

17. An arrangement as claimed in claim 16, wherein said instructions on subscriber charging comprise additional instructions for the subscriber charging to be performed by the service switching point.

18. An arrangement as claimed in claim 17, wherein said additional instructions for the subscriber charging to be performed by the service switching point comprise tariff data for the call.

19. An arrangement as claimed in claim 17, wherein said additional instructions for the subscriber charging to be performed by the service switching point comprise an indication which service procedures are chargeable.

20. An arrangement as claimed in claim 19, wherein said indication is carried in at least one user interaction related instruction to the service switching point and wherein the service procedures include one or more of the following: playing an announcement for the subscriber, prompting and collecting digits from the subscriber, running a user interaction application in an external intelligent peripheral.

21. An arrangement as claimed in claim 19, wherein said indication is given by providing tariff data at service procedure start and/or another tariff data at service procedure end.

22. An arrangement as claimed in claim 16, wherein said instructions on subscriber charging specify whether the subscriber charging performed by the service switching point is to replace the subscriber charging performed by the originating switching point or by the transfer point from which the subscriber's call is routed to the service switching point.

23. An arrangement as claimed in claim 16, wherein the performing of the subscriber charging by the service switching point comprises controlling of the subscriber charging by the service switching point according to the instructions sent to the service switching point.

24. An arrangement as claimed in claim 23, wherein the service switching point is arranged, when controlling the subscriber charging, to notify the originating switching center or the transfer point from which the subscriber's call was routed to the service switching point that the call is free of charge; and to carry out the charging of the subscriber's call.

25. An arrangement as claimed in claim 24, wherein the service switching point is arranged to notify the originating switching center or the transfer point that the call is free of charge by sending in the backward call setup signalling an indicator which states that the call is free of charge.

26. An arrangement as claimed in claim 25, wherein the service switching point is arranged to convey the indicator to be sent in the backward call setup signalling, which indicator states that the call is free of charge, in an ACM (Address Complete Message) and/or an ANM (Answer Message) message.

27. An arrangement as claimed in claim 23, wherein the service switching point is arranged, when controlling the subscriber charging, to send metering pulses to the originating switching center or the transfer point from which the subscriber's call was routed to the service switching point, whereby the charging of the subscriber's call is performed by the originating switching center or by the transfer point.

28. An arrangement as claimed in claim 23, wherein the service switching point is arranged, when controlling the subscriber charging, to send tariff data to the originating switching center or the transfer point from which the subscriber's call was routed to the service switching point, whereby the charging of the subscriber's call is performed by the originating switching center or by the transfer point by means of the tariff data.

29. An arrangement as claimed in claim 16, wherein the performing of the subscriber charging by the service switching point comprises generating charging data records.

30. An arrangement as claimed in claim 29, wherein free of charge charging data records are not generated by the originating switching point and/or sent from there to the operator billing system.

31. An intelligent network service switching point, the intelligent network being used in connection with the telecommunication network and comprising at least one service switching point and at least one service control point, whereby a call of the telecommunication network subscriber is routed from the originating switching point or the transfer point to a particular service switching point in order to produce an intelligent network service, the service switching point being arranged to send an enquiry to the service control point in response to routing the call to the service switching point; and to perform subscriber charging according to instructions sent from the service control point in response to the enquiry received from the service switching.

32. A service switching point as claimed in claim 31, said performing of the subscriber charging by the service switching point comprising controlling of the subscriber charging by the service switching point according to the instructions sent to the service switching point.

33. A service switching point as claimed in claim 32, the service switching point, when controlling the subscriber charging, being arranged to notify the originating switching point or the transfer point from which the subscriber's call was routed to the service switching point that the call is free of charge; and to carry out the charging of the subscriber's call.

34. A service switching point as claimed in claim 33, the service switching point being arranged to notify the originating switching point or the transfer point that the call is free of charge by sending in the backward call setup signalling an indicator stating that the call is free of charge.

35. A service switching point as claimed in claim 34, the service switching point being arranged to convey the indicator to be sent in the backward call setup signalling, which indicator states that the call is free of charge, in an ACM (Address Complete Message) or an ANM (Answer Message) message.

36. A service switching point as claimed in claim 32, the service switching point, when controlling the subscriber charging, being arranged to send metering pulses to the originating switching center or the transfer point from which the subscriber's call was routed to the service switching point, whereby the charging of the subscriber's call can be performed by the originating switching center or by the transfer point by means of the metering pulses.

37. A service switching point as claimed in claim 32, the service switching point, when controlling the subscriber charging, being arranged to send tariff data to the originating switching center or the transfer point from which the subscriber's call was routed to the service switching point, whereby the charging of the subscriber's call can be performed by the originating switching center or by the transfer point by means of the tariff data.

38. A service switching point as claimed in claim 31, the performing of the subscriber charging by the service switching point comprising generating charging data records.

* * * * *